Jan. 13, 1970  O. A. KERSHNER  3,489,253
DISC BRAKE INCLUDING AUTOMATIC ADJUSTING MECHANISM
Filed Nov. 28, 1967  4 Sheets-Sheet 1

Inventor
Osborn A. Kershner
By:
Olson, Trexler, Wolters & Bushnell
attys

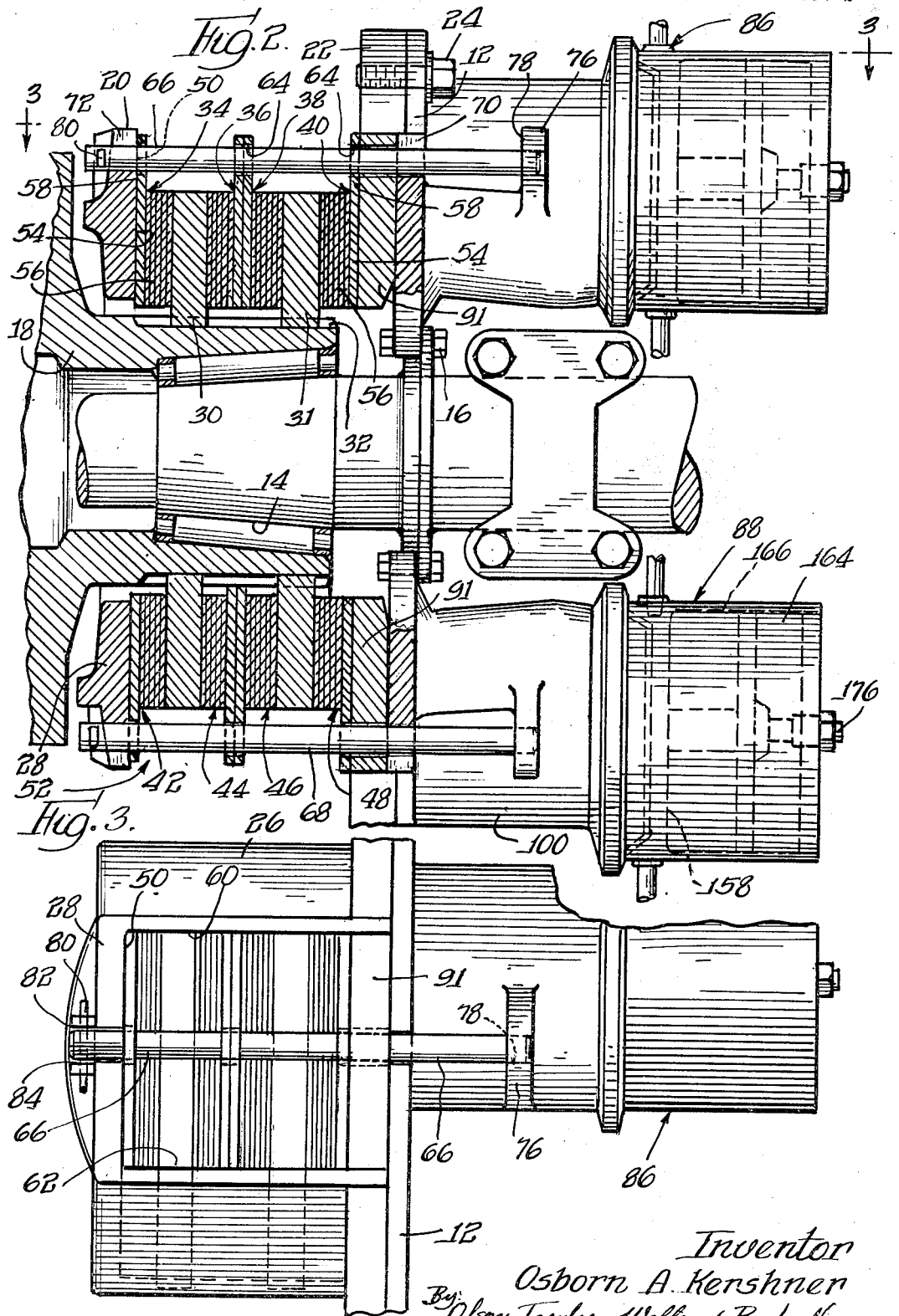

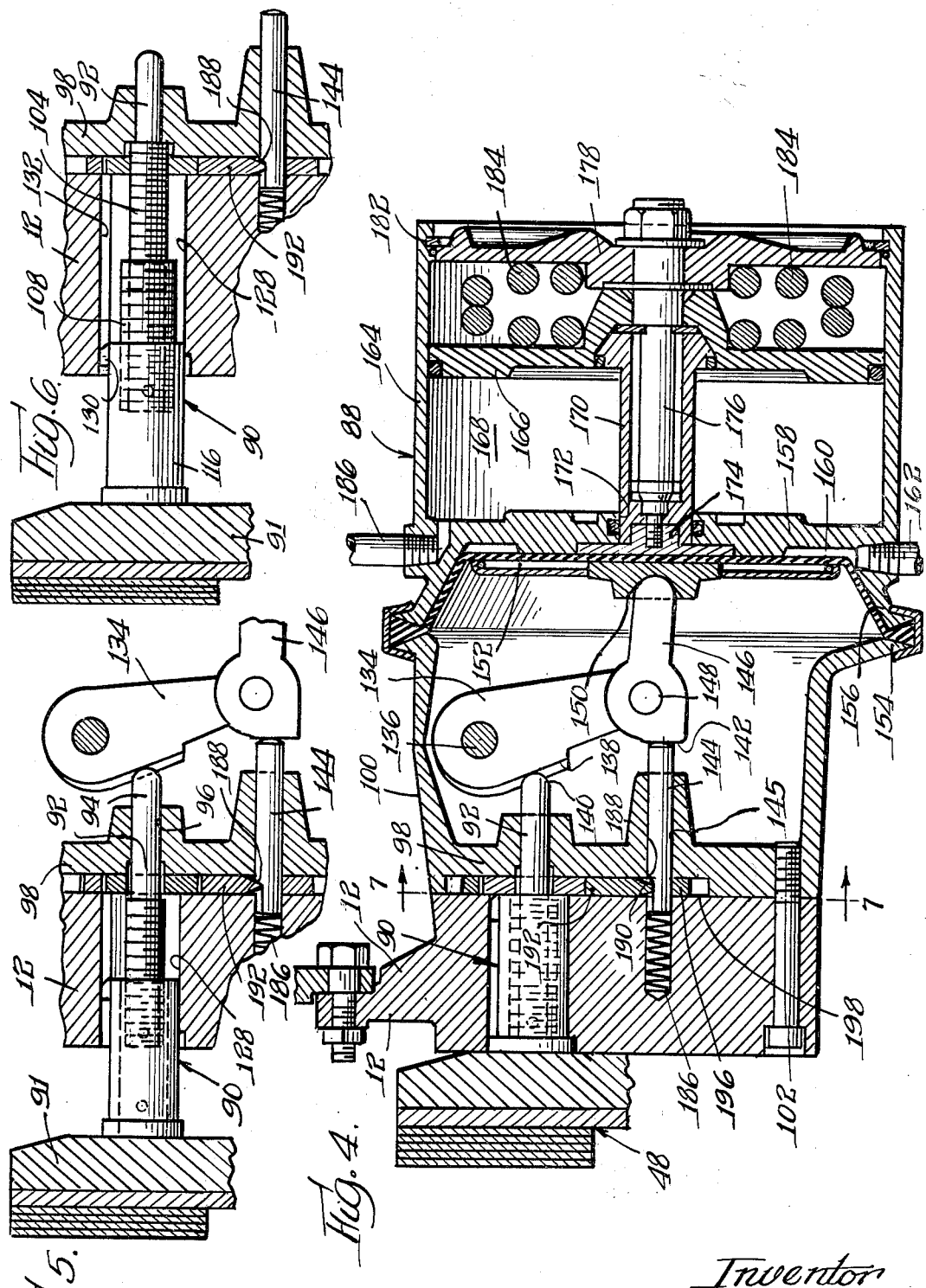

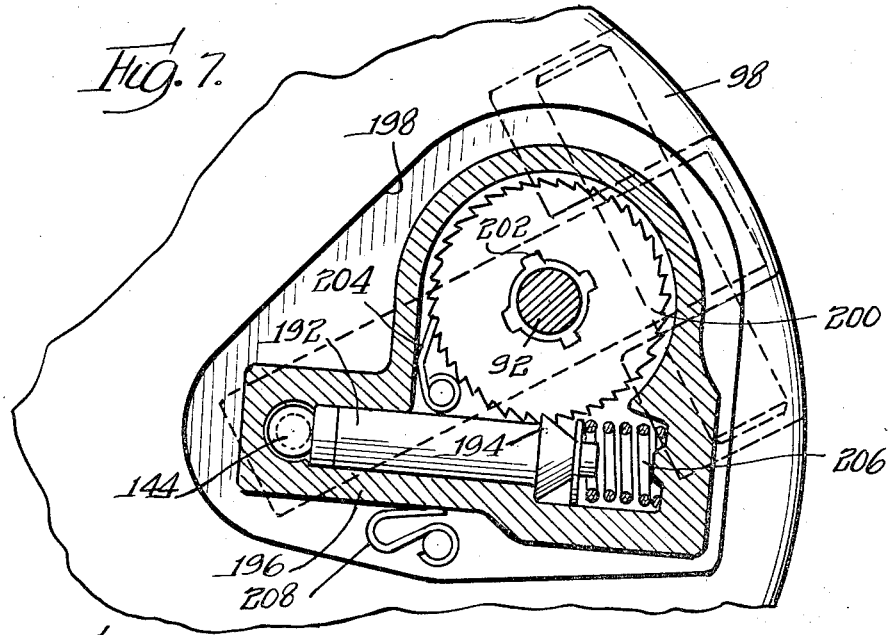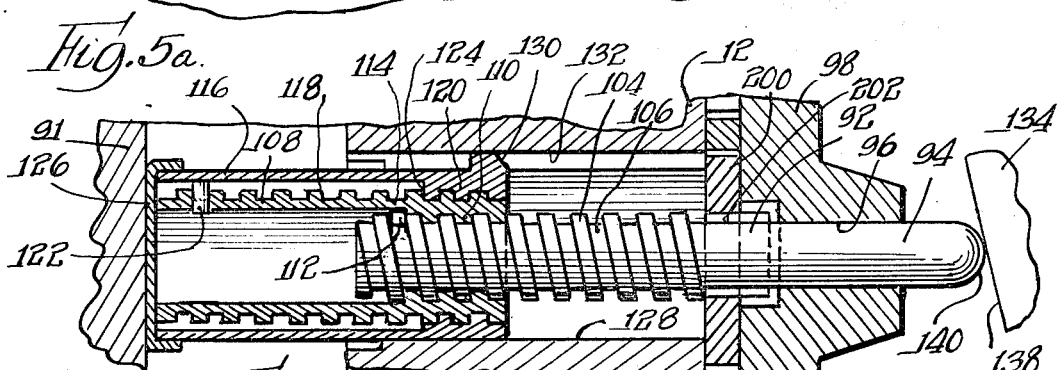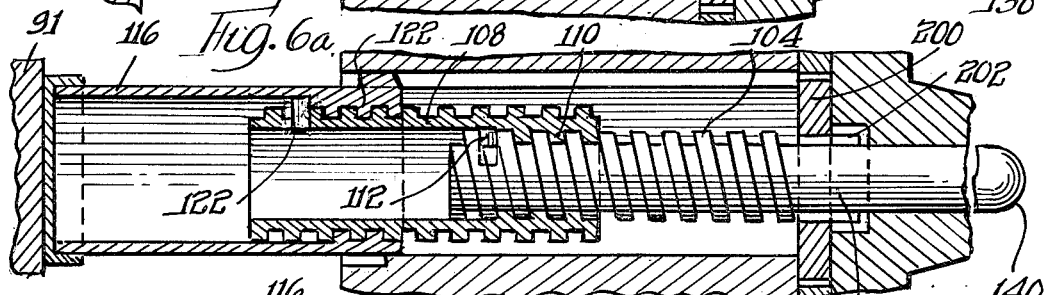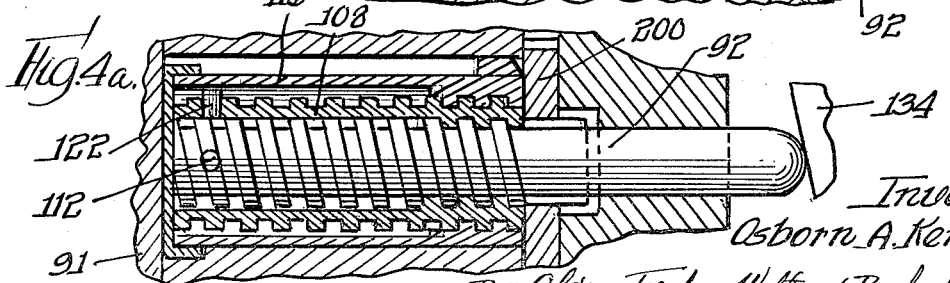

United States Patent Office 3,489,253
Patented Jan. 13, 1970

3,489,253
DISK BRAKE INCLUDING AUTOMATIC
ADJUSTING MECHANISM
Osborn A. Kershner, St., Joseph, Mich., assignor, by mesne assignments, to Lambert Brake Corporation, St. Joseph, Mich., a corporation of Michigan
Filed Nov. 28, 1967, Ser. No. 686,259
Int. Cl. F16d 65/35
U.S. Cl. 188—196                                       4 Claims

ABSTRACT OF THE DISCLOSURE

There is disclosed a disc brake including an adjusting mechanism capable of compensating for large amounts of wear between friction surfaces. The mechanism comprises an extensible assembly including a plurality of telescoping threadedly coupled members which serve as an actuator for energizing the brake and which are rotated relative to each other for accomplishing relative extension and thereby compensating for wear in the brake.

---

The present invention relates to a novel brake for vehicles and the like.

While features of the present invention may be adapted for use in a variety of brake installations, the brake unit shown herein for the purpose of illustrating the invention is especially suitable for use as a heavy duty brake in trucks, truck trailers, tractors, heavy road building vehicles and the like. Of great concern to the operators of heavy duty vehicles is the useful working life of the brakes and the down time which may be required whenever servicing or replacement of brake linings is necessary. It is, therefore, an important object of the present invention to provide a novel brake structure having a relatively long working life and constructed so that down time may be minimized.

A more specific object of the present invention is to provide a novel brake structure having relatively thick brake lining members for increasing the useful life thereof and also incorporating novel automatic adjusting means capable of maintaining desired running clearances in the brake and of accommodating wear of the relatively thick friction members.

Still another object of the present invention is to provide a novel brake unit of the above described type which is of rugged and efficient construction.

A more specific object of the present invention is to provide a novel heavy duty disc brake incorporating rotor means, stator means having relatively thick friction members and an actuating and automatic adjusting mechanism including an axially shiftable assembly for positively applying an actuating force to the rotor and stator means and including telescopically associated members adapted to be extended for accommodating wear of the rotor stator means, and means for extending said assembly in response to a predetermined axial movement thereof for maintaining desired running clearances in the brake.

Other objects and advantages of the present invention will become apparent from the following description and the accompanying drawings wherein:

FIG. 2 is a fragmentary partial sectional view taken generally along line 2—2 in FIG. 1;

FIG. 3 is a fragmentary plan view of the brake unit as seen generally along line 3—3 in FIG. 2;

FIG. 4 is a fragmentary sectional view taken generally along line 4—4 in FIG. 1 and shows the brake unit with an extensible actuating and adjustment assembly incorporating features of the present invention in a fully retracted position;

FIG. 5 is a fragmentary sectional view similar to FIG. 4, but shows the extensible actuating and adjustment assembly in a partially extended position;

FIG. 6 is a fragmentary sectional view similar to FIG. 5, but shows the extensible actuating and adjustment assembly in a fully extended position;

Figure 1:
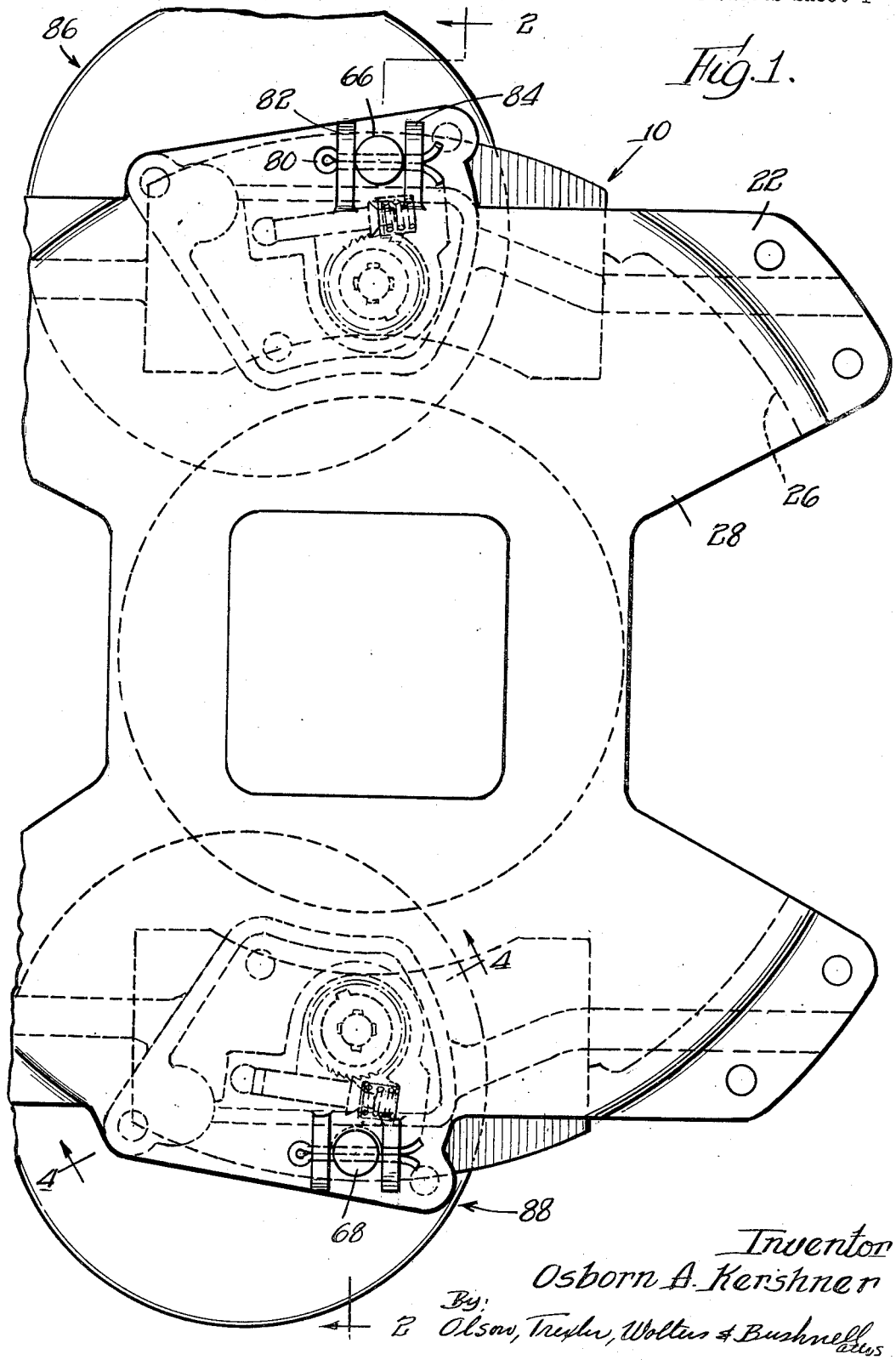
FIG. 1 is a side elevational view showing a brake unit incorporating features of the present invention.

FIG. 7 is a fragmentary sectional view taken generally along line 7—7 in FIG. 4; and FIGS. 4a, 5a and 6a are respectively partial sectional views showing the extensible actuating and adjustment assembly in the fully retracted, partially extended and fully extended positions of FIGS. 4, 5 and 6.

Referring now more specifically to the drawings wherein like parts are designated by the same numerals throughout the various figures, a brake unit 10 incorporating features of the present invention has a base plate or frame member 12 adapted to be mounted and fixed with respect to an axle 14 by means including bolts 16 as shown in FIG. 2. A rotatable member or wheel 18 to be controlled is suitably rotatably mounted on the axle 14. It is understood that the axle and rotatable members 14 and 18 may be of known construction and may be parts of a vehicle or any other desired type of apparatus. Another frame or housing member 20 complementary to the base plate or frame member 12 has a flange 22 secured to the base plate by screws 24. In addition, the member 20 has an axially extending wall 26 merging with an end plate 28 disposed in spaced opposing relationship with respect to the base plate 12.

In the embodiment shown for the purpose of illustrating the present invention, the brake unit is provided with a plurality of annular friction discs or rotor members 30 and 31 connected by flute means 32, with the rotatable member of wheel 18 for rotation therewith while being free for axial movement relative thereto during a braking operation. Groups of friction plates or stator members 34, 36, 38, 40 and 42, 44, 46, 48 are respectively mounted in openings 50 and 52 in opposite portions of the housing or frame wall 26 as shown in FIGS. 2 and 3. Each of the stator members comprises a metal plate 54 to which is bonded or otherwise secured a relatively thick pad 56 of friction or brake lining material. This lining material gradually wears away during use of the brake but since the lining material of each stator member is relatively thick, the brake unit has a relatively long useful life before replacement of the stator members is required.

Each metal plate 54 of the stator members comprises a segment of an annulus and has a laterally outwardly projecting portion 58 extending between opposite side edges 60 and 62 of its associated opening in the housing as shown best in FIG. 3. These side edges of the opening are adapted to engage the ends of the plate portions 58 for absorbing the torque during a braking operation.

The laterally extending portions 58 of the stator plates also have aligned apertures 64 therein. The two groups of stator members are respectively retained in the housing by rods 66 and 68 (see FIGS. 1–3) which extend through the openings 64. The diameter of each opening 64 is substantially greater than the diameter of the rods 66 and 68 so that these rods do not serve to absorb any of the torque which, as indicated above, is transferred from the stator members to the edges 60 or 62 of the housing wall 26, depending upon the direction of rotation of the rotatable member.

With the rods 66 and 68 extending through the apertures in the stator plates, each group of stator members can be removed and replaced as a unit. Thus, the rods are removably connected with the housing or frame means of the brake structure. As shown in FIGS. 1, 2 and 3, U-shaped slots 70 and 72 are formed in the frame portions 12 and 28 for receiving the rod 66. In addition, an ear 76 having an aperture 78 therein is formed integrally with a housing connected to the frame member 12 for receiving and securing one end of the rod 66. The opposite end of the rod is releasably secured by means of a cotter pin 80 which extends therethrough and also through aligned apertures in ears 82 and 84 formed on the housing portion 28. The rod 68 is mounted and secured with respect to the housing or frame structure in the same manner and by essentially identical means as the rod 66 and therefore this duplicate structure need not be described.

In order to energize the brake, duplicate means 86 and 88 are provided for actuating the groups of stator members and axially clamping the stator and rotor members against the end plate portion 28 of the housing. The actuating means 86 and 88 are identical and therefore only the means 88 will be described in detail.

Referring particularly to FIGS. 4-7, it is seen that the actuating means 88 comprises an extensible actuating and adjustment assembly 90 constructed in accordance with features of the present invention and adapted to be axially shifted for moving a power plate segment 91 and urging the stator member 48 axially and thus energizing the brake. The assembly 90 is constructed for providing a positive and unyielding mechanical transfer of an actuating thrust to the power plate 91. At the same time the assembly 90 is constructed so that its effective overall length may be adjusted and extended between relatively widely spaced limits for compensating for wear at the relatively thick friction pads.

In order to accomplish the above, the assembly 90 comprises a first member or rod 92 having an end portion 94 axially slidably mounted in a bore 96 formed in an end wall 98 of a hollow housing or chamber member 100. The member 100 is secured with respect to the base plate or frame member 12 by means such as screws 102. As shown in FIGS. 4–6 and more in detail in FIGS. 4a–6a, the rod 92 has helical thread convolutions 104 formed on an end portion 106 thereof opposite from the end portion 94. A sleeve member 108 is telescoped over the threaded end portion of the rod 92 and is provided with internal thread convolutions 110 in cooperative engagement with the thread convolutions 104. The thread convolutions 104 extend for a considerable portion of the axial length of the rod 92 so that upon rotatation of the rod 92 in the manner described below relative to the slveeve 108, the sleeve may be axially adjusted realtive to the rod from a fully retracted position shown in FIGS. 4, 4a to a fully extended position shown in FIGS. 6, 6a. A pin 112 extends through the rod 92 adjacent to the terminal end of its threaded portion for interfering engagement with an internal shoulder 114 provided by an end of the axially relatively short internal thread convolutions 110 for limiting axial extension of the sleeve relative to the rod 92.

In the embodiment shown, the assembly 90 includes another sleeve 116 extending telescopically over the sleeve 108. Thread convolutions 118 are formed externally along the length of the sleeve 108 for cooperative engagement with axially relatively short internal thread convolutions 120 integral with the sleeve 116. Thus, the sleeve 116 is adapted to be axially adjusted relative to the sleeve 108 from the retracted position shown in FIGS. 4, 4a to the fully extended position shown in FIGS. 6, 6a. A pin 122 extends through the outer end of the intermediate sleeve 108 for engagement with a shoulder 124 at the end of the thread convolutions 120 for limiting axial extension of the outer sleeve with respect to the inner sleeve as shown in FIG. 6a. Preferably, a cap 126 is secured over the end of the sleeve 116 for preventing dirt, moisture and the like from entering within the assembly 90.

The outer sleeve 116 is axially slidably supported within a bore 128 in the base plate or frame member 12. Furthermore, means is provided for preventing rotation of the outer sleeve 116 so that the sleeves will be extended when the rod 92 is adjustably rotated in the manner described below. This means comprises a key 130 formed integrally with the sleeve 116 and projecting into an elongated slot or keyway 132 as shown best in FIGS. 4a, 6a.

Referring particularly to FIGS. 4 and 5, it is seen that the rod 92 of the assembly 90 is engaged by a lever 134 mounted on a pivot pin 136 within the housing 100. The lever has a smooth abutment surface 138 engageable with a rounded end 140 of the rod so that upon pivotal movement of the lever in a clockwise direction as viewed in FIG. 4, the assembly 90 is positively advanced from the fully retracted position shown in FIG. 4 for axially shifting the stator member 48 and energizing the brake. The lever also has an abutment surface 142 adjacent an end thereof opposite from the pivot pin 136 for engaging a cam rod 144 slidably mounted in a bore 145 in the housing wall 98 for the purpose described below.

The actuating means 88 may be provided with a variety of known systems for actuating the lever 134 and energizing the brake. In the embodiment shown, a link 146 has one end pivotally connected to the lever 134 by a pin 148 and an opposite end engaged by a socket element 150 secured to the central portion of a flexible diaphragm 152. The margin of the diaphragm is clamped and sealed between a margin 154 of the housing 100 and a complementary margin 156 of a housing end member 158. The structure is such that a sealed chamber 160 is formed between the diaphragm and the end member 158 which chamber is connectable with a source of fluid such as air under pressure through a conduit 162.

The end member 158 is also connected with a cylinder 164 having a piston 166 slidably disposed therein and cooperating with the end wall 158 in defining a chamber 168 connectable with a source of actuating fluid such as air under pressure by means of a suitable conduit 184. The piston 166 bears against a hollow rod 170 which extends slidably through a sealed bore 172 in the end wall 158 and is coupled with the diaphragm by a fitting 174. The hollow rod 170 extends around a fixed guide rod 176 which is secured to an outer end member 178 fitting within the cylinder and combining with the piston to define another chamber 180. A snap ring 182 or other suitable means is provided for securing the end member 178 within the cylinder. A compression spring 184 is disposed between the end member 178 and the piston 166 for biasing the piston toward the left as viewed in FIG. 4.

The means for actuating the lever 134 is adapted to function in the following manner. When the vehicle or machine is not operating, the chambers 160 and 168 are at atmospheric pressure. Thus, the spring 184 actuates the piston 166 from the retracted position shown in FIG. 4 toward the left so as to advance the diaphragm 152 and the link 148 for pivoting the lever 134 and maintaining the brake in an energized condition. When the vehicle or machine is started and it is desired to release the brake, fluid or air under pressure is introduced into the chamber 168 for shifting the piston 166 against the action of the spring 184 back to its retracted position shown in FIG. 4. This allows the lever 134 to return to its normal position for releasing the clamping pressure applied to the stator members.

In order to energize the brake when the vehicle or machine is in operation with air under pressure in the chamber 168 holding the piston 166 in its retracted position, actuating fluid or air under pressure is introduced into the space 160. This causes the diaphragm 152 to be shifted toward the left as viewed in FIG. 4. During normal operation, the diaphragm pulls with it the hollow stem 170 which has a head portion in abutting but separable engagement with the piston 166. Thus, the diaphragm 152 is movable independently of the piston. However, in the event of an emergency, the chamber 168 may be vented so that the spring 184 may advance the piston 166 against the hollow stem 170 for adding the pressure of the spring to the pressure of the air in the chamber 160.

As will be understood, the brake unit is constructed so that initially there are predetermined minimum running clearances between the adjacent friction surfaces of the rotors and the stator members. This enables the rotatable member to function without frictional drag from the brake while at the same time quick response is obtained when the brake is energized since a minimum amount of movement of the stator members is required in order aggressively to engage the rotors. The friction surfaces of the brake unit and particularly the surfaces of the brake lining elements or pads progressively wear away as the brake is operated so that the running clearances between the surfaces tend to increase. In order to compensate for such wear and to maintain substantially constant running clearances throughout the life of the brake lining material, means is provided for automatically adjusting and extending the previously described assembly 90.

The adjusting means includes the aforementioned cam rod 144 which is held against the abutment surface 142 of the lever 134 by a spring 186 so as to move in unison with the lever. The rod 144 has a cam surface 188 engageable with a complementary cam surface 190 on a slide 192 having an integral pawl 194 as shown best in FIG. 7. The slide 192 is confined and guided by a flat cage member 196 shiftably disposed within a cavity 198 between the base plate 12 and the housing end wall 98. The cage 194 which is shown best in FIG. 7 is pivotally restrained by the cam rod 144 and extends for encircling a ratchet wheel 200 coupled with the rod 92 by interengaging spline means 202. The construction is such that the ratchet wheel and rod 92 are coupled for rotation in unison while at the same time the rod may be shifted axially relative to the ratchet.

A spring detent 204 is fixed within the cavity as shown in FIG. 7 for engaging the teeth of the ratchet wheel and preventing retrograde rotation thereof. Another compression spring 206 is mounted within the cage member for biasing the slide 192 toward the cam rod 144. Still another spring 208 is mounted within the cavity 198 as shown in FIG. 7 for biasing the cage member 196 for pivotal movement around the cam rod 144 in a manner for urging the pawl 194 against the ratchet wheel.

During operation of the brake unit, the lever 134 is actuated as previously described for engaging the rod 92 and shifting the assembly 90 toward the left a distance sufficient to clamp the rotors aggressively between the stator members. At the same time, the lever engages and advances the cam rod 144 a distance proportional to the movement of the assembly 90. As the cam rod 144 moves toward the left as viewed in FIG. 4, the interengaging cam surfaces 188 and 190 cause the slide 192 to be advanced upwardly as viewed in FIG. 4 and toward the right as viewed in FIG. 7 so that the pawl 194 rides up on an adjacent ratchet tooth. Normally, the running clearances between the rotors and stator members are such that this movement of the pawl will be less than the length of one of the ratchet teeth. However, as wear occurs, the running clearances increase and the distance which the pawl is moved increases until the pawl snaps over the adjacent ratchet tooth. Then when the brake is deenergized, the action of the spring 206 not only returns the slide 192 and its pawl, but also causes the ratchet wheel 200 to be rotated a distance equal to the circumferential extent of the tooth. This rotation of the ratchet wheel is, of course, imparted to the rod 92. As the rod is rotated, the previously described sleeve 116 of the assembly 90 which is held against rotation is axially extended so that the effective overall length of the assembly 90 is increased. As this action occurs, the assembly 90 is adjusted from its fully retracted condition and minimum effective length shown in FIG. 4a through an intermediate condition and intermediate effective length shown in FIG. 5a to a fully extended condition shown in FIG. 6a. It will be appreciated that this mechanism is adapted to compensate for the wear of the relatively thick pads of lining material so that the desired running clearances may be maintained throughout the useful life of the brake.

When the friction pads of the stator member have been finally worn away and the assembly 90 has been fully extended, the stator members may be easily replaced and the assembly 90 may be easily readjusted with a minimum of down time. More specifically, the stator members may be removed as a unit with their respective rods 66 and 68 upon removal of the cotter pins. This provides sufficient space within the housing 26 to enable a workman axially to withdraw the entire assembly 90 from the bore 128. The parts of the assembly 90 may then be easily reversely rotated to return the sleeve members to their retracted positions relative to the rod 92 whereupon the device may be again inserted as a unit back into the bore 128. Finally new sets of stator members can be assembled with the rods 66 and 68 and mounted within the housing.

The invention is claimed as follows:

1. In a brake unit having rotor means and friction plate means with interengageable friction surfaces, means for energizing the brake unit and for compensating for wear of said surfaces, said last named means including a power member, an extensible actuating assembly having a predetermined minimum effective length and being extendible to a predetermined greater effective length, means mounting said assembly for bodily movement between retracted and advanced positions for actuating said power member and energizing the brakes, means for increasing the effective length of said assembly upon a predetermined bodily movement of the assembly from said retracted position during a brake energizing operation so as to compensate for wear of said surfaces, said actuating assembly including first and second threadedly interconnected telescoping members, said first member being rotatably and axially slidably disposed within and substantially enclosed by said mounting means, said second member being hollow and telescoping over said first member and having an outer end projecting from said mounting means, said second member having means sealing the outer end thereof, means between said second member and said mounting means for preventing rotation of the second member, and said means for increasing the effective length of said assembly comprising means for rotating said first member after a predetermined bodily movement of the assembly from said retracted position.

2. A brake unit having rotor means and friction plate means with interengageable friction surfaces, means for energizing the brake unit and for compensating for wear of said surfaces comprising a power member, and extensible actuating assembly having a predetermined minimum effective length and being extendible to a predetermined greater effective length, means mounting said assembly for bodily movement between retracted and advanced positions for actuating said power member and energizing the brake, means for increasing the effective length of said assembly upon a predetermined bodily movement of the assembly from the retracted position during a brake energizing operation so as to compensate for wear of said surfaces, said assembly including a plurality of telescoping threadedly interconnected members relatively axially movable for extension of the assembly upon relative rotation of the members, a first of said members being rotatably disposed in said mounting means, said assembly including a third member telescoping over and threadedly coupled with said first member and telescoping within and threadedly coupled with said second member, and stop means for limiting axial extension of said third member with respect to said first member.

3. A structure, as defined in claim 1, which includes actuating means for bodily shifting said assembly and energizing the brake, said actuating means comprising a pivotally mounted lever adjacent to and engageable with said assembly, means for actuating said lever, said means for increasing the effective length of said assembly including cam means engageable by and responsive to movement of said lever, and a ratchet mechanism connected with said assembly and shiftable upon a predetermined movement of said cam means.

4. A brake comprising housing means mountable on a fixed member adjacent a rotatable member to be controlled, said housing means including interconnected first and second oppositely disposed end walls, rotor means disposed between said end walls and connectable with said rotatable member, stator means including a power member shiftably mounted between said walls for engagement with said rotor means when the brake is energized, an extensible assembly mounted in said housing means for bodily axial movement from a retracted position for engaging and actuating said power member, said assembly having a predetermined minimum effective length and being extendible to a predetermined greater effective length, said assembly including a plurality of telescoping threadedly interconnected members including a first member axially slidable and rotatable relative to said housing means and a second member, means restraining said second member against rotation relative to said housing means, and means for increasing the effective length of said assembly including a ratchet wheel rotatably mounted in said housing means and restrained against axial displacement, means axially slidably and non-rotatably connecting said ratchet wheel with said first member for rotating said first member upon rotation of the ratchet wheel, a lever pivotally mounted adjacent to and engageable with said first member for axially bodily shifting said assembly for energizing the brake, a pawl element slidably mounted in said housing means and engageable with said ratchet wheel, a cam element extending between said lever and said pawl element for shifting the pawl element in response to movement of the lever during energizing of the brake, and spring means engaging said pawl element for returning the pawl element and driving said ratchet wheel upon deenergizing of the brake.

References Cited

UNITED STATES PATENTS

| | | |
|---|---|---|
| 2,002,139 | 5/1935 | Des Rosiers. |
| 2,554,064 | 5/1951 | Shields. |
| 3,236,336 | 2/1966 | Harrison. |
| 3,392,805 | 7/1968 | Kreitner. |

DUANE A. REGER, Primary Examiner

U.S. Cl. X.R.

188—72